United States Patent
Yagi et al.

(10) Patent No.: US 8,354,456 B2
(45) Date of Patent: Jan. 15, 2013

(54) PRODUCTION METHOD OF LIQUID HYDROCARBONS FROM NATURAL GAS

(75) Inventors: Fuyuki Yagi, Yokohama (JP); Kenichi Kawazuishi, Yokohama (JP)

(73) Assignees: Japan Oil, Gas and Metals National Corporation, Kawasaki-shi, Kanagawa (JP); Inpex Corporation, Tokyo (JP); JX Nippon Oil & Energy Corporation, Tokyo (JP); Japan Petroleum Exploration Co., Ltd., Tokyo (JP); Cosmo Oil Co., Ltd., Tokyo (JP); Nippon Steel Engineering Co., Ltd., Tokyo (JP); Chiyoda Corporation, Yokohama-shi, Kanagawa (JP)

( * ) Notice: Subject to any disclaimer, the term of this patent is extended or adjusted under 35 U.S.C. 154(b) by 232 days.

(21) Appl. No.: 12/920,737

(22) PCT Filed: Mar. 25, 2009

(86) PCT No.: PCT/JP2009/056769
§ 371 (c)(1),
(2), (4) Date: Sep. 2, 2010

(87) PCT Pub. No.: WO2009/123247
PCT Pub. Date: Oct. 8, 2009

(65) Prior Publication Data
US 2011/0015282 A1 Jan. 20, 2011

(30) Foreign Application Priority Data

Mar. 31, 2008 (JP) ................................. 2008-089592

(51) Int. Cl.
*C07C 27/00* (2006.01)
(52) U.S. Cl. .......................... 518/700; 518/704; 518/705

(58) Field of Classification Search .................. 518/700, 518/704, 705
See application file for complete search history.

(56) References Cited

U.S. PATENT DOCUMENTS 6,103,773 A * 8/2000 Wittenbrink et al. ......... 518/702
(Continued)

FOREIGN PATENT DOCUMENTS
JP 03-242302 A 10/1991
(Continued)

OTHER PUBLICATIONS

International Search Report of PCT/JP2009/056769, mailing date Jun. 2, 2009.
(Continued)

*Primary Examiner* — Jafar Parsa
(74) *Attorney, Agent, or Firm* — Westerman, Hattori, Daniels & Adrian, LLP (57) ABSTRACT

In a so-called GTL process for producing liquid hydrocarbons containing fuel oil by producing synthesis gas from natural gas, subsequently producing Fischer-Tropsch oil from the obtained synthesis gas by way of Fischer-Tropsch synthesis and upgrading the produced Fischer-Tropsch oil, the synthesis gas produced from a synthesis gas production step is partly branched at a stage prior to getting to a Fischer-Tropsch oil production step and high-purity hydrogen is separated and produced from the synthesis gas entering the branch line. All the separated high-purity hydrogen is supplied to an upgrading reaction step and consumed as hydrogen for an upgrading reaction. Additionally, the synthesis gas entering the branch line is subjected to a water gas shift reaction to raise the hydrogen concentration before the step of separating and producing high-purity hydrogen and the residual gas left after the separation may be circulated to the synthesis gas production step as raw material for producing synthesis gas.

6 Claims, 3 Drawing Sheets

U.S. PATENT DOCUMENTS

| | | |
|---|---|---|
| 6,147,126 A | 11/2000 | DeGeorge et al. |
| 6,495,610 B1 | 12/2002 | Brown |
| 2002/0016375 A1 | 2/2002 | Iijima et al. |
| 2006/0106119 A1 | 5/2006 | Guo et al. |

FOREIGN PATENT DOCUMENTS

| | | |
|---|---|---|
| JP | 2001-342003 A | 12/2001 |
| JP | 2007-297443 A | 11/2007 |
| WO | 2004/083342 A1 | 9/2004 |
| WO | 2004/088225 A2 | 10/2004 |
| WO | 2005/113475 A2 | 12/2005 |
| WO | 2007/114274 A1 | 10/2007 |

OTHER PUBLICATIONS

Notification of Transmittal of Translation of the International Preliminary Report on Patentability (Form PCT/IB/338) of International Application No. PCT/JP2009/056769 mailed Dec. 23, 2010 with Forms PCT/IB1373, PCT/ISA/237, and PCT/IB/326.

Extended European Search Report dated Jun. 6, 2012, issued in corresponding European Patent Application 09728372.5.

* cited by examiner

PRODUCTION METHOD OF LIQUID HYDROCARBONS FROM NATURAL GAS

TECHNICAL FIELD

This invention relates to a so-called GTL process for producing liquid hydrocarbons that contain fuel oil from natural gas.

BACKGROUND ART

Figure 3:
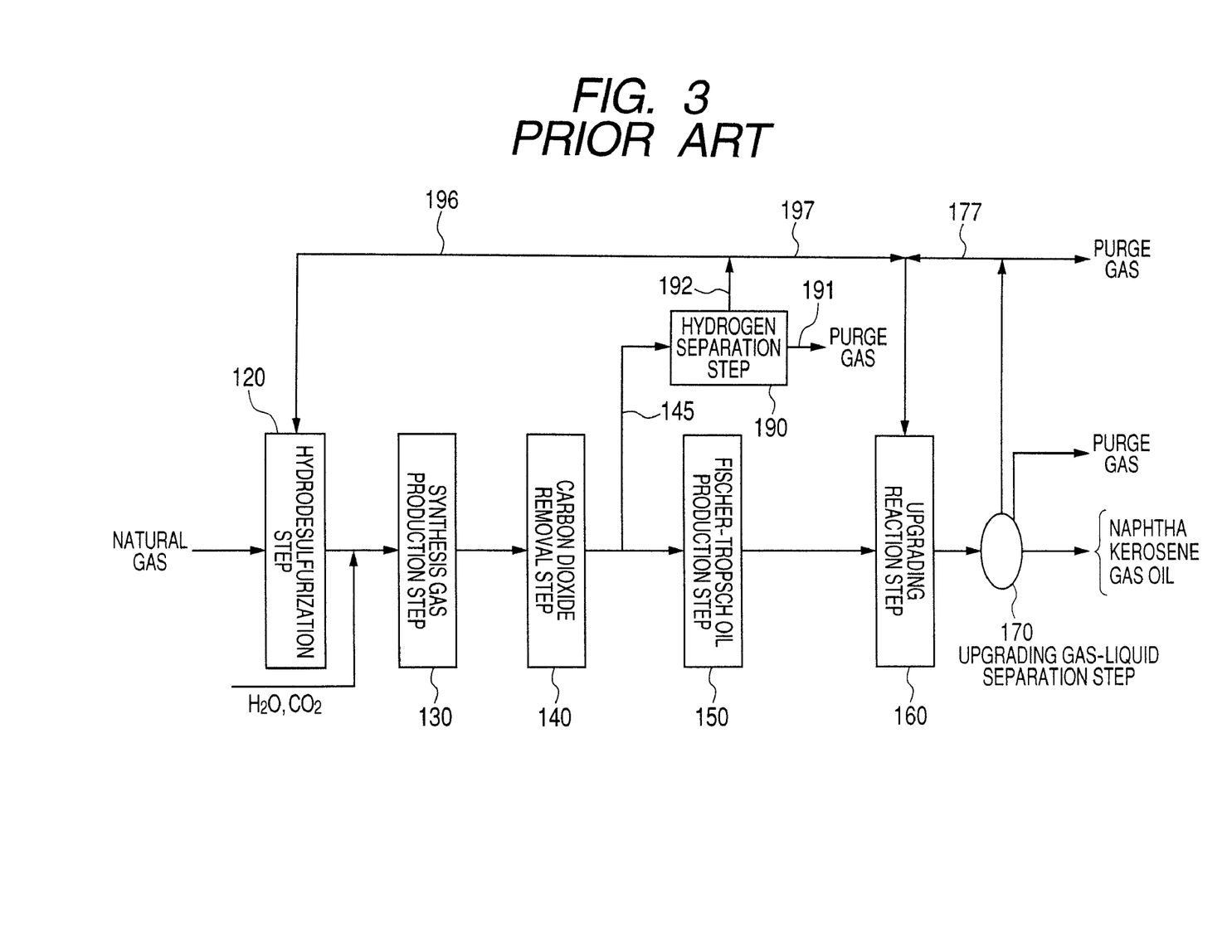
FIG. 3 is a scheme showing the production method of liquid hydrocarbons from natural gas according to the prior art.

A so-called GTL process for producing liquid hydrocarbons that contain fuel oil from natural gas is described, for example, in WO 2007/114274 A1. FIG. 3 of the accompanying drawings is a schematic illustration of the flow of such a known GTL process.

The GTL process illustrated in FIG. 3 includes a hydrodesulfurization step 120 of hydrodesulfurizing sulfur compounds in natural gas, a synthesis gas production step 130 of producing synthesis gas by way of a reforming reaction of natural gas with steam and/or carbon dioxide, a carbon dioxide removal step 140, which is provided whenever necessary, a Fischer-Tropsch oil production step 150 of producing Fischer-Tropsch oil from the synthesis gas by way of Fischer-Tropsch (FT) synthesis, an upgrading reaction step 160 of hydrogenating the produced Fischer-Tropsch oil and an upgrading gas/liquid separation step 170 of subjecting the hydrogenated product obtained by the upgrading reaction step to gas/liquid separation to obtain liquid hydrocarbons, the above steps being arranged sequentially from the natural gas feed side (or the upstream side) or from the left side in FIG. 3.

The synthesis gas produced from the synthesis gas production step 130 partly branches off at a stage prior to getting to the Fischer-Tropsch oil production step 150 to form a branch line 145 and the synthesis gas in the branch line 145 is separated into high-purity hydrogen (line 192) and purge gas (line 191) in a hydrogen separation step 190 typically by means of a hydrogen PSA (pressure swing adsorption) method. The separated high-purity hydrogen partly joins a hydrogen circulation line 177, by way of lines 192 and 197, where hydrogen circulates from the upgrading gas/liquid separation step 170 to the upgrading reaction step 160, while the remaining part is supplied to a hydrodesulfurization step through a line 196. On the other hand, the purge gas that is purged from the line 191 is normally consumed as fuel.

In the above-described known process, the concentration of hydrogen supplied to the upgrading reaction step 160 is about 92 mol %. If the concentration of hydrogen supplied to the upgrading reaction step 160 can be raised from the level of the prior art, the pressure required for the hydrogenation reaction of the upgrading reaction step 160 can be reduced to reduce the operation cost. Additionally, the reaction efficiency is improved to make it possible to reduce the size of the reactor for the upgrading reaction step 160. Furthermore, the step can be conducted at a lower reaction temperature to suppress deactivation of the catalyst and increase the catalyst life.

Since the purge gas 191 discharged from the hydrogen separation step 190 contains unreacted methane, a significant improvement can be achieved in terms of raw material consumption per product to an economic advantage if it can be taken into the process once again and reutilized as raw material.

However, there is not any technique proposed to date to dissolve the above-identified problem and realize a realistic process for treating such purge gas.

DISCLOSURE OF THE INVENTION

In view of the above-identified circumstances, the object of the present invention is to provide a method that can reduce the operation cost of the upgrading reaction step, downsize the reactors for upgrading reaction step 160 and also take the purge gas discharged from the hydrogen separation step in a GTL process for producing liquid hydrocarbons from natural gas back into the process once again so as to reutilize it as raw material and thereby achieve an improvement in terms of the raw material consumption per product.

According to the present invention, the above object is achieved by providing a production method of liquid hydrocarbons from natural gas, including: a hydrodesulfurization step of removing sulfur compounds in natural gas by hydrodesulfurization; a synthesis gas production step of producing synthesis gas by way of a reforming reaction of the natural gas after hydrodesulfurization with steam and/or carbon dioxide; a Fischer-Tropsch oil production step of producing Fischer-Tropsch oil from the synthesis gas by subjecting the synthesis gas produced from the synthesis gas production step to a Fischer-Tropsch reaction; an upgrading reaction step of hydrogenating the Fischer-Tropsch oil produced from the Fischer-Tropsch oil production step; an upgrading gas/liquid separation step of subjecting the hydrogenated product obtained by the upgrading reaction step to gas/liquid separation to obtain liquid hydrocarbons; and a hydrogen separation step of partly branching the synthesis gas produced from the synthesis gas production step to form a branch line at a stage prior to getting to the Fischer-Tropsch oil production step, separating and producing high-purity hydrogen from the synthesis gas entering the branch line and separating the consequently produced residual gas, wherein the high-purity hydrogen separated and produced by the hydrogen separation step is entirely supplied to the upgrading reaction step and employed as hydrogen for the upgrading reaction.

Preferably, in the production method of liquid hydrocarbons from natural gas as defined above, the high-purity hydrogen separated in the hydrogen separation step and the hydrogen containing gas separated in the upgrading gas/liquid separation step are employed as hydrogen for the upgrading reaction so as to make the concentration of hydrogen to be used for the upgrading reaction equal to 96.0 to 97.5 mol %.

Preferably, in the production method of liquid hydrocarbons from natural gas as defined above, the hydrogen containing gas separated in the upgrading gas/liquid separation step is supplied to the upgrading reaction step and also to the hydrodesulfurization step.

Preferably, the production method of liquid hydrocarbons from natural gas as defined above further includes a shift step of subjecting the synthesis gas entering the branch line to a water gas shift reaction for raising the hydrogen concentration as a step arranged prior to the hydrogen separation step so as to circulate the residual gas (purge gas) separated in the hydrogen separation step to the synthesis gas production step to use the residual gas as raw material for producing synthesis gas.

Preferably, in the production method of liquid hydrocarbons from natural gas as defined above, the residual gas (purge gas) separated in the hydrogen separation step contains methane and carbon dioxide as main components.

Preferably, in the production method of liquid hydrocarbons from natural gas as defined above, the synthesis gas production step is so arranged that steam and/or carbon dioxide are added at a ratio of $H_2O/C=0.0$ to 3.0 and/or at a ratio of $CO_2/C=0.0$ to 1.0, where $H_2O$ and $CO_2$ represent the number of $H_2O$ molecules and the number of $CO_2$ molecules respectively and C represents the number of carbon atoms in hydrocarbons originating from the hydrocarbons supplied as raw material.

Preferably, in the production method of liquid hydrocarbons from natural gas as defined above, the synthesis gas production step is so arranged that the outlet temperature and the outlet pressure of the catalyst bed are respectively 800 to 950° C. and 1.5 to 3.0 MPaG and the gas hourly space velocity (GHSV) is 500 to 5,000 $hr^{-1}$.

Preferably, in the production method of liquid hydrocarbons from natural gas as defined above, the synthesis gas production step is so arranged that the natural gas supplied as raw material contains hydrocarbons having 1 to 6 carbon atoms, which include methane as a main component.

Thus, according to the present invention, the hydrogen separation step is provided, in which the synthesis gas produced from the synthesis gas production step is partly branched to form a branch line at a stage prior to getting to the Fischer-Tropsch oil production step to separate high purity hydrogen from the synthesis gas entering the branch line, and all the high-purity hydrogen separated in the hydrogen separation step is supplied to the upgrading reaction step and employed as hydrogen for the upgrading reaction. Thus, the operation cost of the upgrading reaction step can be reduced and the reactors for upgrading reaction step can be downsized.

Additionally, according to the present invention, there is provided a shift step as a step preceding the hydrogen separation step in order to raise the hydrogen concentration by subjecting synthesis gas to a water gas shift reaction. Then, the residual gas (purge gas) separated in the hydrogen separation step is circulated to the synthesis gas production step in order to use it as raw material for synthesis gas production. Therefore, an improvement can be achieved in terms of raw material consumption per product by taking the purge gas coming from the hydrogen separation step that used to be consumed as fuel into the process once again and reusing it as raw material.

BEST MODE FOR CARRYING OUT THE INVENTION

Now, the present invention will be described in greater detail by way of embodiments.

First Embodiment

Figure 1:
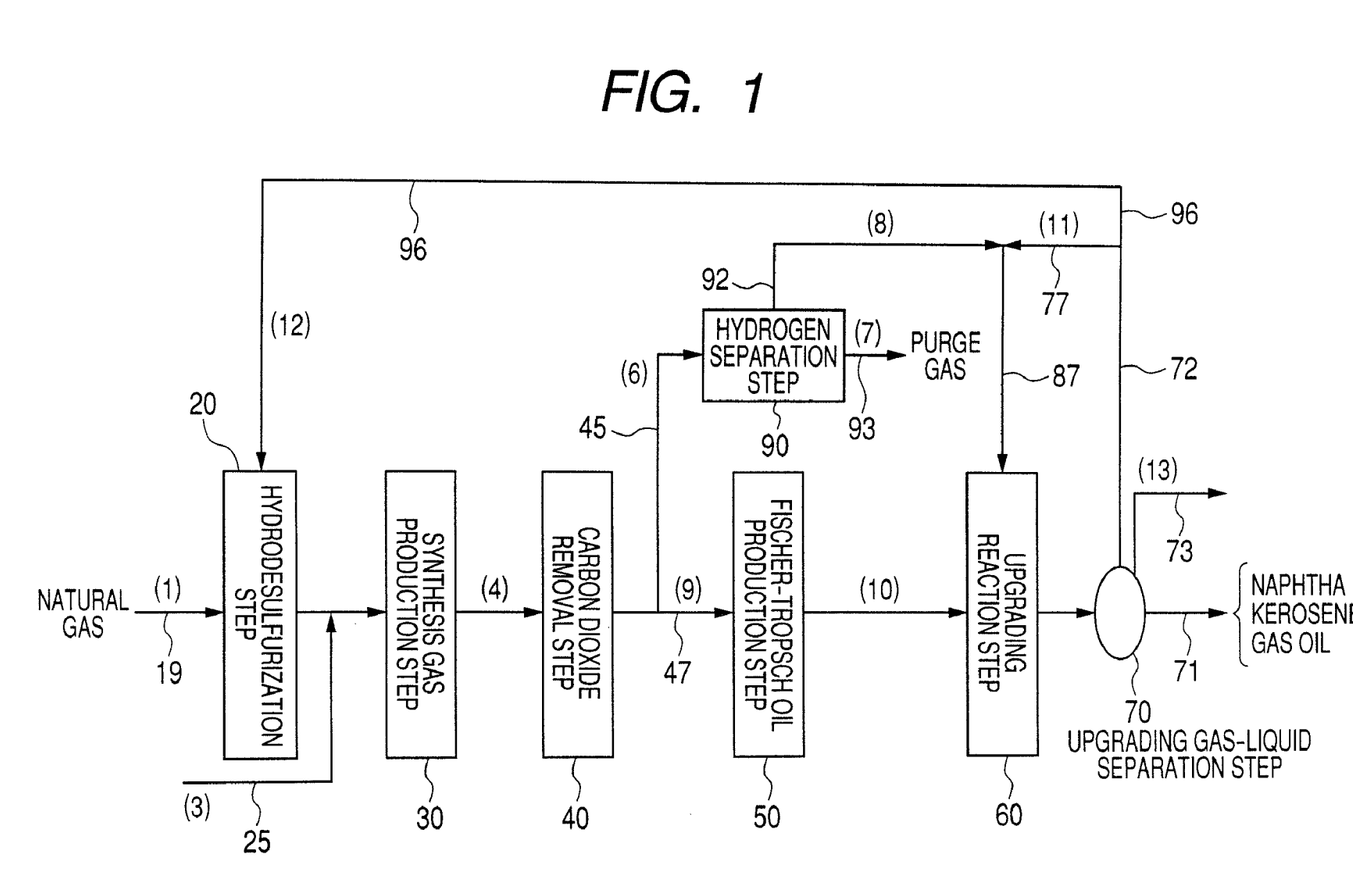
FIG. 1 is a scheme showing the production method of liquid hydrocarbons from natural gas according to the first embodiment of the present invention.

FIG. 1 is a scheme showing the production method of liquid hydrocarbons from natural gas according to the first embodiment of the present invention.

The production method of liquid hydrocarbons from natural gas according to the first embodiment of the present invention basically includes a hydrodesulfurization step 20 of removing sulfur compounds in natural gas by hydrodesulfurization, a synthesis gas production step 30 of producing synthesis gas by way of a reforming reaction of natural gas with steam and/or carbon dioxide, a carbon dioxide removal step 40, which is provided whenever necessary, a Fischer-Tropsch oil production step 50 of producing Fischer-Tropsch oil from the synthesis gas by subjecting the synthesis gas to a Fischer-Tropsch reaction, an upgrading reaction step 60 of hydrogenating the obtained Fischer-Tropsch oil, and an upgrading gas/liquid separation step 70 of subjecting the obtained hydrogenated product to gas/liquid separation to produce liquid hydrocarbons, the above steps being arranged sequentially from the natural gas feed side (the line 19 side) or from the left side in FIG. 1.

While the upgrading reaction step 60 and the upgrading gas/liquid separation step 70 are shown as separate steps in FIG. 1, they may be combined to a single step that is not divided into two separate steps. Then, the step is simply referred to as "upgrading step".

As shown in FIG. 1, the synthesis gas produced from the synthesis gas production step 30 is subjected, if necessary, to carbon dioxide removal and subsequently partly branched off at a stage prior to getting to the Fischer-Tropsch oil production step 50 to form a branch line 45 and the synthesis gas branched to the branch line 45 is introduced into the hydrogen separation step 90.

In the hydrogen separation step 90, high-purity hydrogen is separated from the residual gas that is produced at the same time. All the high-purity hydrogen produced from the hydrogen separation step 90 is then supplied to the upgrading reaction step 60 by way of a line 92 and a line 87. On the other hand, the residual gas (purge gas) separated in the hydrogen separation step 90 is purged and typically consumed as fuel.

The production method of liquid hydrocarbons from natural gas according to the present invention as illustrated in FIG. 1 is characterized in that the synthesis gas produced from the synthesis gas production step 30 is partly branched off at a stage prior to getting to the Fischer-Tropsch oil production step 50 to form a branch line 45 and the synthesis gas branched off to the branch line 45 is introduced into the hydrogen separation step 90 to separate and produce high-purity hydrogen and residual gas so as to supply all the produced high-purity hydrogen to the upgrading reaction step 60.

The hydrogen containing gas that is separated and put into a line 72 in the upgrading gas/liquid separation step 70 is partly made to flow through line 77 and join the flow of high-purity hydrogen from the hydrogen separation step 90 before it is supplied to the upgrading reaction step 60 by way of the line 87, while the remaining part of the hydrogen containing gas is supplied to the hydrodesulfurization step 20 by way of a line 96.

Now, each of the steps of the production method of liquid hydrocarbons from natural gas according to the present invention will be described in detail below.

A. Hydrodesulfurization Step 20

The hydrodesulfurization step indicated by reference symbol 20 in FIG. 1 is a step of hydrodesulfurizing the sulfur compounds that are contained in the natural gas fed from the line 19 as raw material.

The hydrogen containing gas that is separated in the upgrading gas/liquid separation step 70 is partly supplied as hydrogen for the hydrodesulfurization by way of the lines 72 and 96 to the hydrodesulfurization step.

B. Synthesis Gas Production Step 30

The synthesis gas production step 30 is a step of producing synthesis gas (CO and $H_2$) by way of a reforming reaction of the natural gas supplied as raw material with steam and/or carbon dioxide. In other words, it is a step of producing synthesis gas containing CO and $H_2$ as main components by reforming the natural gas as raw material that contains methane as main component with steam ($H_2O$) and/or carbon dioxide ($CO_2$) in the presence of a synthesis gas production catalyst.

Steam ($H_2O$) and/or carbon dioxide ($CO_2$) are supplied from a line 25. When the natural gas that is supplied as raw material contains carbon dioxide ($CO_2$) in advance, only steam ($H_2O$) may be supplied from the line 25.

For the synthesis gas production step 30, steam and/or carbon dioxide that are added are so adjusted that they are added at a ratio of $H_2O/C$=0.0 to 3.0 and/or at a ratio of $CO_2/C$=0.0 to 1.0 (both molecules/atoms ratio), where $H_2O$ and $CO_2$ represent the number of $H_2O$ molecules and the number of $CO_2$ molecules respectively and C represents the number of carbon atoms in hydrocarbons originating from the hydrocarbons supplied as raw material.

The ratio of $H_2O/C$ is preferably within a range between 0.3 and 1.7 and more preferably within a range between 0.7 and 1.3. On the other hand, the ratio of $CO_2/C$ is preferably within a range between 0.2 and 0.8 and more preferably within a range between 0.4 and 0.6.

In the synthesis gas production step 30 of the present invention, normally the outlet temperature of the catalyst bed is preferably between 800 and 950° C. and more preferably between 850 and 920° C., while the outlet pressure of the catalyst bed is preferably between 1.5 and 3.0 MPaG. The gas hourly space velocity (GHSV) is preferably between 500 and 5,000 hr$^{-1}$.

(Catalyst for Synthesis Gas Production)

The catalyst for producing synthesis gas has a carrier that acts as base material and catalytically active metal carried by the carrier.

A molded body of calcined magnesium oxide is preferably used as carrier. Such a molded body is formed by mixing magnesium oxide powder and a lubricant, molding the mixture under pressure into a predetermined profile and subsequently calcining the molded body. While the molded body may take any shape without limitations, it preferably shows a profile suited as industrial catalyst such as ring-shaped or saddle-shaped, as a multi-hole body or as pellets.

The molded body of magnesium oxide that acts as carrier preferably has a specific surface area of 0.1 to 1.0 m$^2$/g, more preferably 0.2 to 0.5 m$^2$/g, as observed by means of the BET method. When the specific surface area exceeds 1.0 m$^2$/g, there is a tendency to increase the rate of formation of carbon and to cause a disadvantage that the catalytic activity is reduced. When the specific surface area is less than 0.1 m$^2$/g, there is a tendency that the catalytic activity per unit catalyst is so small that a large amount of the catalyst must be disadvantageously used. Generally, the specific surface area of the carrier to be obtained can be controlled by adjusting the calcining temperature and the calcining time.

Magnesium oxide (MgO) used as a carrier may be obtained by calcining commercially available magnesium oxide (MgO). The purity of magnesium oxide (MgO) is required to be not less than 98 wt %, preferably not less than 99 wt %. Contamination of components enhancing the carbon deposition activity or components decomposing under a high temperature and reducing gas atmosphere, such as iron, nickel and the like metals and silicon dioxide ($SiO_2$), is particularly undesirable.

Ruthenium (Ru) that acts as catalytically active metal is carried by the carrier within a range between 10 and 5,000 wt-ppm, preferably between 100 and 2,000 wt-ppm, in terms of metal equivalent (the weight ratio relative to the catalyst carrier). An amount of Ru above 5,000 wt-ppm is undesirable because the cost of catalyst increases and because carbon deposition tends to occur during production. Such a too small amount of Ru as below 10 wt-ppm fails to provide satisfactory catalytic activity.

Ruthenium (Ru) may be replaced by rhodium (Rh) for the purpose of the present invention.

A preferable method of preparing a synthesis gas production catalyst will be described below as an example.

(1) Formation of Catalyst Carrier

Powdery magnesium oxide (MgO) is mixed with a lubricant, which may typically be carbon, and molded to show a predetermined profile under pressure. Subsequently, the molded product is calcined at temperature not lower than 1,000° C., preferably between 1,150 and 1,300° C., more preferably between 1,150 and 1,250° C. for one to four hours normally in the atmosphere.

While the activity of an ordinary reforming catalyst depends on the type of the catalyst, it is substantially proportional to its external surface area. Therefore, the catalytic activity rises when the particle size of the catalyst is reduced but at the same time the pressure loss rises because the gas mass velocity is high. For this reason, a cylindrical shape catalyst is widely used.

(2) Carrying Catalytically Active Metal (Ru)

The molded magnesium oxide can be made to carry ruthenium (Ru) on its external surface by impregnating the formed carrier with an aqueous solution containing ruthenium salt and subsequently drying and calcining it.

Methods that can suitably be used for impregnating the formed carrier with an aqueous solution containing ruthenium salt include an immersion method and a spray method, of which the spray method of atomizing an aqueous solution containing ruthenium salt and spraying it toward the carrier may preferably be used for the purpose of the present invention. Ruthenium chloride or ruthenium nitrate may suitably be used as ruthenium salt.

The carrier that carries Ru is then dried at temperature between 50 and 150° C. for one to four hours and subsequently calcined at temperature between 150 and 500° C., preferably between 350 and 450° C., for one to four hours. The atmosphere of the drying and the calcining may be air. The reaction activity of the catalytically active metal is boosted further by the calcining.

(Synthesis Gas Production)

Synthesis gas that contains CO and $H_2$ as main components is produced as a result of reforming with $H_2O$ and/or $CO_2$ that is conducted in the presence of the synthesis gas production catalyst prepared in the above-described manner by using mixture gas containing natural gas (hydrocarbons having 1 to 6 carbon atoms and generally containing methane as main component), steam and/or carbon dioxide supplied from the line 25, and hydrogen and hydrocarbons having 1 to 6 carbon atoms containing methane as main components recycled by way of a line 96.

Assume here that methane is the main component of the supplied raw material.

(a) When methane ($CH_4$) is made to react with carbon dioxide ($CO_2$) ($CO_2$ reforming), the reaction that proceeds is expressed by formula (1) shown below.

$$CH_4 + CO_2 \rightarrow 2CO + 2H_2 \tag{1}$$

(b) When methane ($CH_4$) is made to react with steam ($H_2O$) (steam reforming), the reaction that proceeds is expressed by formula (2) shown below.

$$CH_4 + H_2O . CO + 3H_2 \quad (2)$$

(c) Under the conditions of reforming reaction, a water gas shift reaction that is expressed by formula (3) shown below proceeds simultaneously with the reactions of the formulas (1) and (2) shown above because the catalyst has an activity for the shift reaction.

$$CO + H_2O . CO_2 + H_2 \quad (3)$$

From the formulas (1) and (2) shown above, stoichiometrically, synthesis gas showing an $H_2/CO$ mol ratio=1 and synthesis gas showing an $H_2/CO$ mol ratio=3 are produced respectively in the $CO_2$ reforming of methane and in the steam reforming of methane. Thus, it is now possible to directly produce synthesis gas showing an $H_2/CO$ mol ratio=2 that is suited for FT synthesis by combining these reactions without requiring gas separation of separating hydrogen from generated gas.

However, under the reaction conditions for directly producing synthesis gas with such a mol ratio, generated gas generally shows a composition that is apt to deposit carbon on the surface of the catalyst to deactivate the catalyst due to the carbon deposit. Therefore, a catalyst for producing synthesis gas as described above is employed as catalyst that can dissolve this problem.

C. Carbon Dioxide Removal Step 40

This is a step of removing carbon dioxide gas from synthesis gas. For example, an operation of removing carbon dioxide gas by means of a liquid absorbent such as amine and subsequently stripping carbon dioxide gas from the liquid absorbent that contains carbon dioxide gas to regenerate the liquid absorbent is conducted. However, the carbon dioxide removal step 40 is not indispensable and may not necessarily be provided.

D. Fischer-Tropsch Oil Production Step (FT Synthesis Step) 50

Synthesis gas as described above is subjected to a Fischer-Tropsch reaction and the gaseous product is separated from the reaction product to produce Fischer-Tropsch oil.

An FT synthesis reaction is a reaction for producing a mixture of hydrocarbons from CO and $H_2$ of synthesis gas by means of formula shown below.

$$CO + 2H_2 \rightarrow 1/n - (CH_2)_n - + H_2O$$

Catalytically active metals that can be used for the above reaction include iron (Fe), cobalt (Co), ruthenium (Ru) and nickel (Ni) in the state of metal. If desired, such a catalytically active metal may be supported on a carrier such as silica, alumina, silica-alumina or titania.

The reaction conditions generally include: reaction temperature: 200 to 350° C. and reaction pressure: atmospheric pressure to about 4.0 MPaG. When an iron catalyst is employed, the reaction conditions preferably include: reaction temperature: 250 to 350° C. and reaction pressure: about 2.0 to 4.0 MPaG. When a cobalt catalyst is employed, the reaction conditions preferably include: reaction temperature 220 to 250° C. and reaction pressure: about 0.5 to 4.0 MPaG.

The reaction is a sort of polymerization reaction. Generally, it is difficult to keep the degree of polymerization (n) to a constant level and the reaction product broadly spreads over a range of $C_1$ to $C_{100+}$. Then, the distribution of the number of carbon atoms of the generated hydrocarbons conforms to the Schulz-Flory distribution law and can be expressed by the chain growth probability · of the distribution law. In the case of an industrial catalyst, · has a value between about 0.85 and 0.95.

The FT reaction primarily produces ·-olefins which undergo the following secondary reactions. Namely, the secondary reactions include hydrogenation resulting in the formation of straight chain paraffins, hydrocracking resulting in the formation of lower paraffin such as methane, and secondary chain growth reactions resulting in the formation of higher hydrocarbons. Alcohol such as ethanol, ketones such as acetone and carboxylic acids such as acetic acid are produced as by-products only by small quantities.

Reactors that can be used for the FT synthesis include fixed bed reactors, fluidized bed reactors, slurry bed reactors and supercritical reactors.

Since a refining process such as a dust elimination process and a desulfurization process for protecting the catalyst are executed at the stage of producing synthesis gas that is used as raw material for FT synthesis, the obtained hydrocarbons contain neither sulfur nor heavy metals and hence are very clean.

The hydrocarbons produced by means of FT synthesis are mostly composed of straight chain olefins (1-olefin) and normal paraffins.

The separation means that can be used for separating the gaseous product from the Fischer-Tropsch reaction product to produce Fischer-Tropsch oil (hydrocarbon oil) is not subjected to any particular limitations and may be selected from various known separation means. A flash evaporator may be an example.

E. Upgrading Reaction Step 60

The Fischer-Tropsch oil obtained from the Fischer-Tropsch oil production step 50 is then subjected to hydrogenation (catalytic hydrogenation).

Although the hydrogenation is not subjected to any particular limitations, the fixed bed reactor is generally employed for the hydrogenation process. The hydrogenation conditions typically include: reaction temperature: about 175 to 400° C. and hydrogen partial pressure: 1 to 25 MPaG (10 to 250 atm).

The high-purity hydrogen produced from the hydrogen separation step 90 (as supplied by way of the lines 92 and 87) and the hydrogen separated in the upgrading gas-liquid separation step 70 (as supplied by way of the lines 72, 77 and 87), which will be described hereinafter, are employed for the hydrogenation process. Note that the line 92 and the line 77 shown in FIG. 1 join each other to become the line 87 for supplying hydrogen to the upgrading reaction step 60. The flow of hydrogen containing gas separated in the upgrading gas/liquid separation step 70 that runs through the line 72 is branched into the line 77 and the line 96.

F. Upgrading Gas-Liquid Separation Step 70

The product hydrocarbons 71 such as naphtha, kerosene and gas oil and the gaseous substances containing hydrogen as main component are separated from each other in the upgrading gas-liquid separation step 70. As described above, the gaseous substances containing hydrogen as main component is circulated to and used in the upgrading reaction step 60 by way of the lines 72, 77 and 87 and the gaseous substances are partly discharged from a line 73 as purge gas.

G. Hydrogen Separation Step 90

The synthesis gas produced from the synthesis gas production step 30 and passed through the carbon dioxide removal step 40 is partly branched from the main line to enter the branch line 45 at a stage prior to getting to the Fischer-Tropsch oil production step 50. Then, as shown in FIG. 1, a hydrogen separation step 90 is assigned to the branch line 45. The main line after the branching is denoted by reference symbol 47.

High-purity hydrogen 92 is produced from the hydrogen separation step 90 and the consequently produced residual gas 93 is separated. The residual gas 93 contains methane and carbon monoxide as main components as well as hydrogen that is left unseparated. The residual gas 93 is normally consumed as fuel.

A hydrogen pressure swing adsorption (PSA) apparatus is preferably employed for the hydrogen separation step 90. A hydrogen PSA apparatus contains adsorbents (zeolite-based adsorbents, active carbon, alumina, silica gel, etc.) in a plurality of adsorption towers that are arranged in parallel and is adapted to separate high-purity hydrogen gas (e.g., not less than 98%) from the synthesis gas by sequentially and repetitively executing steps of pressurizing, adsorbing, desorbing (depressurizing) and purging hydrogen in each adsorption tower. The separated high-purity hydrogen gas can be supplied by way of the line 92. However, the hydrogen separation step 90 is not limited to the use of the above-described hydrogen PSA process and a hydrogen storing alloy absorption process, a membrane separation process or a combination of any of them may alternatively be employed.

The rate at which synthesis gas is supplied to the branch line 45 is determined according to the rate of supply of hydrogen required in the upgrading reaction step 60 and the hydrodesulfurization step 20.

In the first embodiment illustrated in FIG. 1, all the high-purity hydrogen separated and produced in the hydrogen separation step 90 is supplied to the upgrading reaction step 60 and consumed for the upgrading reaction so that the operation cost of the upgrading reaction step can be reduced and the reactors for upgrading reaction step can be downsized.

Additionally, the catalyst life can be extended by reducing the reaction temperature.

Second Embodiment

Figure 2:
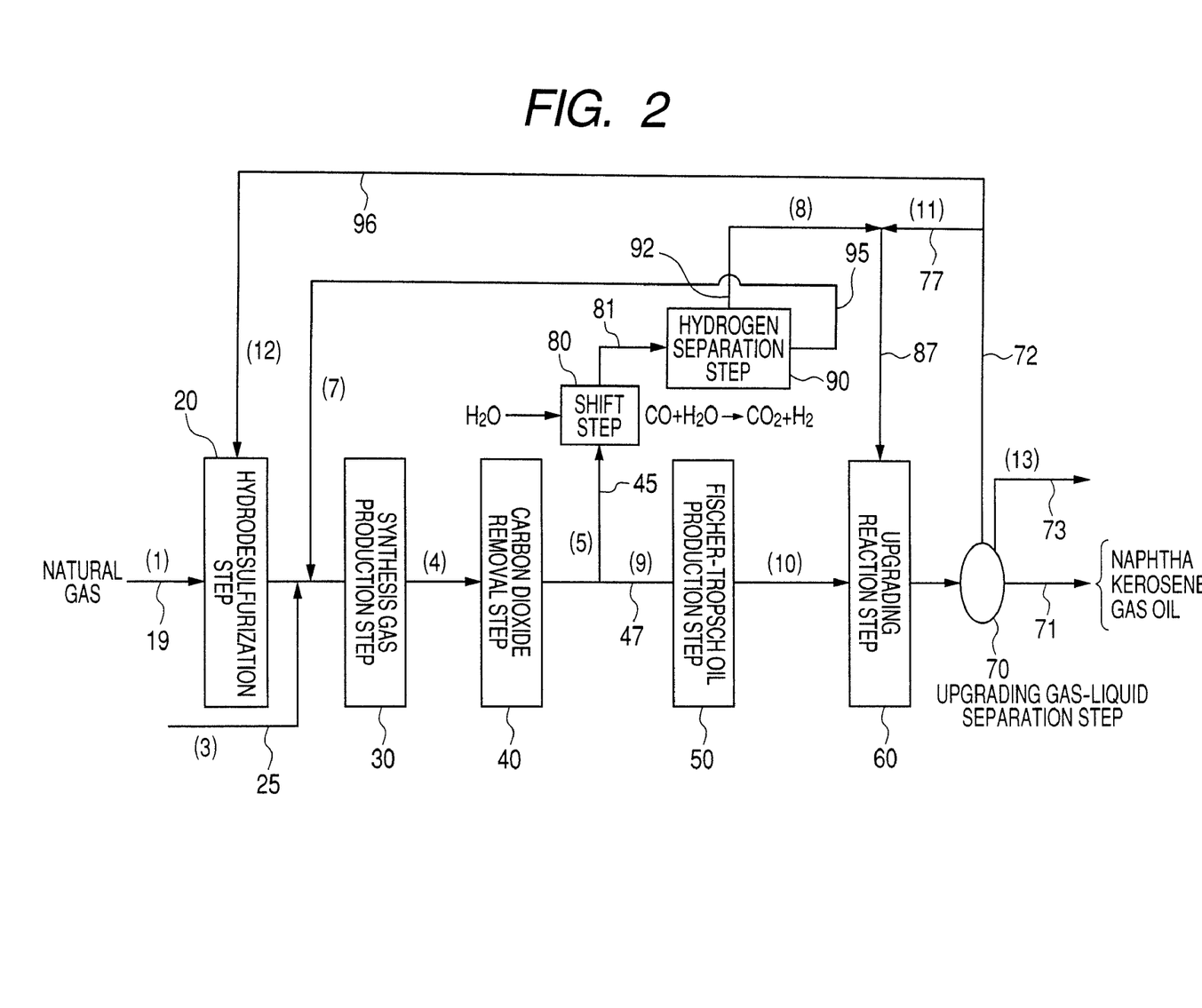
FIG. 2 is a scheme showing the production method of liquid hydrocarbons from natural gas according to the second embodiment of the present invention.

FIG. 2 is a scheme showing the production method of liquid hydrocarbons from natural gas according to the second embodiment of the present invention.

The second embodiment illustrated in FIG. 2 differs from the first embodiment shown in FIG. 1 in terms of (1) and (2) listed below.
(1) As shown in FIG. 2, a shift step 80 is interposed between the branch line 45 and the hydrogen separation step 90 in order to raise the hydrogen concentration by way of a water gas shift step where the synthesis gas entering the branch line is subjected to a water gas shift reaction.
(2) As shown in FIG. 2, the residual gas separated in the hydrogen separation step 90 is circulated to the synthesis gas production step 30 by way of the line 95 and consumed as raw material for producing synthesis gas.

Now, the shift step 80 illustrated in FIG. 2 will be described below.
H. Shift Step 80

The synthesis gas produced from the synthesis gas production step 30 and passed through the carbon dioxide removal step 40 is partly branched from the main line so as to get into branch line 45 at a stage before entering the Fischer-Tropsch oil production step 50. The main line after the branching is indicated by reference symbol 47.

As shown in FIG. 2, the shift step 80 is assigned to the branch line 45. The hydrogen concentration of the synthesis gas passing through the branch line 45 is raised as a result of a water gas shift reaction of the shift step 80. More specifically, CO which is a component of the synthesis gas reacts with steam as seen from the reaction formula shown below (water gas shift reaction) to produce $H_2$ and $CO_2$ so that consequently the hydrogen concentration is raised.

The synthesis gas whose hydrogen concentration is raised in the shift step 80 is made to enter the hydrogen separation step 90 by way of a line 81. High-purity hydrogen is produced from the hydrogen separation step 90 as a result of a hydrogen separating operation and the consequently produced residual gas is separated. All the high-purity hydrogen separated and produced in the hydrogen separation step 90 is supplied to the upgrading reaction step 60 by way of the line 92 and the line 87. On the other hand, the residual gas separated in the hydrogen separation step 90 is taken out from the line 95 and circulated to the synthesis gas production step 30 so as to be consumed as raw material for synthesis gas production. The residual gas contains methane and carbon dioxide as main components as well as hydrogen that is left unseparated.

In the second embodiment illustrated in FIG. 2, the synthesis gas entering the branch line 45 is subjected to a water gas shift reaction to raise the hydrogen concentration thereof before it is put into the hydrogen separation step and the residual gas (purge gas) separated in the hydrogen separation step is circulated to the synthesis gas production step so as to be consumed as raw material for synthesis gas production. Thus, the second embodiment provides an advantage of taking the purge gas coming from the hydrogen separation step that is used to be consumed as fuel into the process once again and reutilizing it as raw material to achieve an improvement in terms of raw material consumption per product in addition to the advantages of the above-described first embodiment.

Now, the present invention will be described in greater detail below by way of examples.

Example 1

Synthesis gas of $H_2/CO=2.0$ that is suitable for FT (Fischer-Tropsch) synthesis of liquid hydrocarbons was produced from natural gas by way of the steps shown in FIG. 1.

A catalyst having Ru supported on an MgO carrier was used as synthesis gas production catalyst.

The reaction conditions of the synthesis gas production step 30 were as follows: catalyst bed outlet temperature: 900° C., catalyst bed outlet pressure: 2.0 MPaG, GHSV 2000 hr$^{-1}$, $H_2O/C=0.94$ and $CO_2/C=0.37$ ($H_2O$: the number of $H_2O$ molecules; $CO_2$: the number of $CO_2$ molecules; C: number of carbon atoms in hydrocarbons originating from hydrocarbons supplied as raw material). The composition of the natural gas was $C1/C2/C3/C4/C5/C6+/CO_2/N_2=64.0/2.9/1.7/0.9/0.3/0.1/30.0/0.1$ (molar ratio).

The material balance was determined and secured from the inlet of the synthesis gas production step to the outlet of the upgrading reaction step shown in FIG. 1 and the synthesis gas production step in the production method of liquid hydrocarbons from natural gas was evaluated on the basis of the material balance. The material balance was computationally determined on the basis of the compositions observed at the spots indicated by reference symbols (1) through (13) in FIG. 1.

As a result, the hydrogen concentration of the hydrogen containing gas supplied to the upgrading reaction step was 97%, which provides an improvement of about 4.6% relative to the prior art concentration of 92.4%. Thus, the hydrogenating activity is improved in the upgrading reaction step to make it possible to reduce the quantity of the catalyst by about 10% if compared with the prior art of FIG. 3. When the quantity of the catalyst of the prior art is maintained for operation, the reaction temperature can be reduced by about 3° C. so that the catalyst life can be extended by about 25%.

Example 2

Synthesis gas of $H_2/CO=2.0$ that is suitable for FT (Fischer-Tropsch) synthesis of liquid hydrocarbons was produced from natural gas by way of the steps shown in FIG. 2.

A catalyst having Ru supported on an MgO carrier was used as synthesis gas production catalyst.

The reaction conditions of the synthesis gas production step 30 were as follows: catalyst bed outlet temperature: 900° C., catalyst bed outlet pressure: 2.0 MPaG, GHSV of 2000 $hr^{-1}$, $H_2O/C=1.03$ and $CO_2/C=0.38$ (molecules/atoms ratios, C: number of carbon atoms in hydrocarbons originating from hydrocarbons supplied as raw material). The composition of the natural gas was C1/C2/C3/C4/C5/C6+/$CO_2$/$N_2$=64.0/2.9/1.7/0.9/0.3/0.1/30.0/0.1 (molar ratio).

The material balance was determined and secured from the inlet of the synthesis gas production step to the outlet of the upgrading reaction step shown in FIG. 2 and the synthesis gas production step in the production method of liquid hydrocarbons from natural gas was evaluated on the basis of the material balance. The material balance was computationally determined on the basis of the compositions observed at the spots indicated by reference symbols (1) through (13) in FIG. 2.

As a result, in addition to the advantage of improving the hydrogen concentration in the upgrading reaction step of Example 1, a method according to the present invention that includes a step of recycling residual gas achieved a ratio of 64.9% by which the carbon atoms of the hydrocarbons in the raw material natural gas are converted to liquid hydrocarbons products (kerosene, gas oil, naphtha) to prove an improvement relative to the ratio of 60.8% of the prior art of FIG. 3. Additionally, according to the present invention, the rate of supply of raw material natural gas was reduced by 6.8% from the rate of supply of the conventional process (or the prior art shown in FIG. 3).

As described above, according to the present invention, all the high-purity hydrogen separated and produced in the hydrogen separation step is supplied to the upgrading reaction step and consumed as hydrogen for the upgrading reaction to make it possible to reduce the operation cost of the upgrading reaction step and downsize the reactors for upgrading reaction step.

Additionally, it is possible to achieve an improvement in terms of raw material consumption per product when a shift step is provided as a step preceding the hydrogen separation step so as to subject synthesis gas to a water gas shift reaction in order to raise the hydrogen concentration and the residual gas (purge gas) separated in the hydrogen separation step is circulated to the synthesis gas production step in order to use it as raw material for synthesis gas production because the purge gas that is conventionally consumed as fuel can be taken into the process once again and reutilized as raw material.

INDUSTRIAL APPLICABILITY

Thus, according to the present invention, natural gas can be chemically converted and utilized for gas to liquids (GTL) processes for producing liquid hydrocarbons.

This application claims the benefit of Japanese Patent Application No. 2008-089592, filed Mar. 31, 2008, which is hereby incorporated by reference herein in its entirety.

The invention claimed is:

1. A production method of liquid hydrocarbons from natural gas, comprising:
    a hydrodesulfurization step of removing sulfur compounds in natural gas by hydrodesulfurization;
    a synthesis gas production step of producing synthesis gas by way of a reforming reaction of the natural gas after hydrodesulfurization with steam and/or carbon dioxide;
    a Fischer-Tropsch oil production step of producing Fischer-Tropsch oil from the synthesis gas by subjecting the synthesis gas produced from the synthesis gas production step to a Fischer-Tropsch reaction;
    an upgrading reaction step of hydrogenating the Fischer-Tropsch oil produced from the Fischer-Tropsch oil production step;
    an upgrading gas/liquid separation step of subjecting the hydrogenated product obtained by the upgrading reaction step to gas/liquid separation to obtain liquid hydrocarbons; and
    a hydrogen separation step of partly branching the synthesis gas produced from the synthesis gas production step to form a branch line at a stage prior to getting to the Fischer-Tropsch oil production step, separating and producing high-purity hydrogen from the synthesis gas entering the branch line and separating the consequently produced residual gas,
    wherein the high-purity hydrogen separated and produced by the hydrogen separation step is entirely supplied to the upgrading reaction step and employed as hydrogen for the upgrading reaction together with hydrogen containing gas separated in the upgrading gas/liquid separation step so as to make the concentration of hydrogen to be used for the upgrading reaction equal to 96.0 to 97.5 mol %, while the hydrogen containing gas separated in the upgrading gas/liquid separation step is supplied also to the hydrodesulfurization step.

2. The method according to claim 1, further comprising a shift step of subjecting the synthesis gas entering the branch line to a water gas shift reaction for raising the hydrogen gas concentration as a step arranged prior to the hydrogen separation step so as to circulate the residual gas separated in the hydrogen separation step to the synthesis gas production step to use the residual gas as raw material for producing synthesis gas.

3. The method according to claim 2, wherein the residual gas separated in the hydrogen separation step contains methane and carbon dioxide as main components.

4. The method according to claim 1, wherein the synthesis gas production step is so arranged that steam and/or carbon dioxide are added at a ratio of $H_2O/C=0.0$ to 3.0 and/or at a ratio of $CO_2/C=0.0$ to 1.0, where $H_2O$ and $CO_2$ represent the number of $H_2O$ molecules and the number of $CO_2$ molecules respectively and C represents the number of carbon atoms in hydrocarbons originating from the hydrocarbons supplied as raw material.

5. The method according to claim 1, wherein the synthesis gas production step is so arranged that the outlet temperature and the outlet pressure of the catalyst bed are respectively 800 to 950° C. and 1.5 to 3.0 MPaG and the gas hourly space velocity (GHSV) is 500 to 5,000 $hr^{-1}$.

6. The method according to claim 1, wherein the synthesis gas production step is so arranged that the natural gas supplied as raw material contains hydrocarbons having 1 to 6 carbon atoms, which include methane as a main component.

* * * * *